(12) United States Patent
Luan et al.

(10) Patent No.: US 7,877,254 B2
(45) Date of Patent: Jan. 25, 2011

(54) METHOD AND APPARATUS FOR ENROLLMENT AND VERIFICATION OF SPEAKER AUTHENTICATION

(75) Inventors: Jian Luan, Don Cheng District (CN); Pei Ding, Don Cheng District (CN); Lei He, Don Cheng District (CN); Jie Hao, Don Cheng District (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 956 days.

(21) Appl. No.: 11/692,397

(22) Filed: Mar. 28, 2007

(65) Prior Publication Data

US 2007/0239451 A1 Oct. 11, 2007

(30) Foreign Application Priority Data

Apr. 6, 2006 (CN) .................. 2006 1 0073144

(51) Int. Cl.
G10L 17/00 (2006.01)
G10L 19/00 (2006.01)
G10L 15/06 (2006.01)

(52) U.S. Cl. .................. 704/250; 704/219; 704/243; 704/246

(58) Field of Classification Search .................. None
See application file for complete search history.

(56) References Cited

U.S. PATENT DOCUMENTS

| 4,133,976 A | | 1/1979 | Atal et al. | |
|---|---|---|---|---|
| 5,522,012 A | * | 5/1996 | Mammone et al. | .......... 704/250 |
| 5,548,647 A | * | 8/1996 | Naik et al. | .................. 704/200 |
| 5,956,681 A | | 9/1999 | Yamakita | |
| 6,256,609 B1 | * | 7/2001 | Byrnes et al. | ................ 704/246 |
| 6,327,562 B1 | | 12/2001 | Proust | |
| 6,681,205 B1 | | 1/2004 | San Martin et al. | |
| 7,233,898 B2 | * | 6/2007 | Byrnes et al. | ................ 704/246 |

(Continued)

FOREIGN PATENT DOCUMENTS

EP 1 005 021 A2 5/2000

(Continued)

OTHER PUBLICATIONS

"Speaker recognition using hidden Markov models, dynamic time warping and vector quantization" by K. Yu, J. Mason, J. Oglesby (Vision, Image and Signal Processing, IEEE Proceedings, vol. 142, No. 5, Oct. 1995, pp. 313-318).

(Continued)

*Primary Examiner*—Matthew J Sked
(74) *Attorney, Agent, or Firm*—Oblon, Spivak, McClelland, Maier & Neustadt, L.L.P.

(57) ABSTRACT

The present invention provides a method and apparatus for enrollment and verification of speaker authentication. The method for enrollment of speaker authentication, comprising: extracting an acoustic feature vector sequence from an enrollment utterance of a speaker; and generating a speaker template using the acoustic feature vector sequence; wherein said step of extracting an acoustic feature vector sequence comprises: generating a filter-bank for the enrollment utterance of the speaker for filtering locations and energies of formants in the spectrum of the enrollment utterance based on the enrollment utterance; filtering the spectrum of the enrollment utterance by the generated filter-bank; and generating the acoustic feature vector sequence from the filtered enrollment utterance.

15 Claims, 6 Drawing Sheets

U.S. PATENT DOCUMENTS

| | | | |
|---|---|---|---|
| 7,536,304 B2 * | 5/2009 | Di Mambro et al. | 704/273 |
| 7,778,831 B2 * | 8/2010 | Chen | 704/246 |
| 2003/0018471 A1 * | 1/2003 | Cheng et al. | 704/233 |

FOREIGN PATENT DOCUMENTS

| | | |
|---|---|---|
| EP | 1 533 791 A2 | 5/2005 |
| GB | 2 140 256 A | 11/1984 |

OTHER PUBLICATIONS

"Signal Modeling Techniques in Speech Recognition" by J. W. Picone (Proceedings of the IEEE, vol. 81, No. 9, Sep. 1993, pp. 1215-1247).

"A Study of Line Spectrum Pair Frequency Representation for Speech Recognition" by Fikret S. Gurgen, Shigeki Sagayama, Sadaoki Furui (IEICE Trans. Fundamentals, vol. E75-A, No. 1, Jan. 1992, pp. 98-102).

"Cross words reference template for DTW-based speech recognition systems" by W. H. Abdulla, D. Chow, and G. Sin (IEEE TENCON 2003, pp. 1576-1579).

"Formant Estimation for Speech Recognition" by L. Welling, H. Ney (IEEE Transaction on Speech and Audio Processing, vol. 6, No. 1, Jan. 1998).

"Formant Estimation Method Using Inverse-Filter Control" by A. Watanabe (IEEE Transactions on Speech and Audio Processing, vol. 9, No. 4, May 2001).

"Fundamental of Applied Information Theory" by X.L. Zhu (Chapter 7, Tsinghua University Press, Beijing, 2000).

* cited by examiner

METHOD AND APPARATUS FOR ENROLLMENT AND VERIFICATION OF SPEAKER AUTHENTICATION

TECHNICAL FIELD

The present invention relates to information processing technology, and specifically to speaker authentication.

TECHNICAL BACKGROUND

By using the pronunciation features of each speaker when he/she is speaking, different speakers may be identified, so that speaker authentication can be performed. In the article "Speaker recognition using hidden Markov models, dynamic time warping and vector quantization" by K. Yu, J. Mason, J. Oglesby (Vision, Image and Signal Processing, IEE Proceedings, Vol. 142, October 1995, pp. 313-18), three common kinds of speaker identification engine technology are introduced, which are HMM (Hidden Markov Model), DTW (Dynamic Timing Warping), and VQ (Vector Quantization).

Usually, the process of speaker authentication includes two phases, enrollment and verification. In the phase of enrollment, the speaker template of a speaker is generated based on an utterance containing a password spoken by the same speaker (user); in the phase of verification, it is determined whether the test utterance is the utterance with the same password spoken by the same speaker based on the speaker template.

In the phase of enrollment, generally, the speaker template is obtained through training by clean speech data, while in the phase of verification, the actually incoming speech is noisy. Thus, the matching between noisy incoming data and clean template will definitely lead to the reduction of the authentication precision.

Substantially, the matching between a test utterance and an enrollment template is to compare the acoustics features of the test utterance with those of the enrollment template. Therefore, whether in the phase of enrollment or in the phase of verification, it is fairly important for the speaker authentication to select and extract the acoustic features from an utterance.

The principal task in the extraction of the acoustic feature from an utterance is to extract the basic features that can characterize the speaker from the utterance signal. The extracted acoustic features of the utterance should be able to effectively distinguish different speakers, while being able to keep the relative stability for the changes between the utterances from a same speaker. In the article "Signal Modeling Techniques in Speech Recognition" by J. W. Picone (Proceedings of the IEEE, 1993, 81(9): 1215-1247), an utterance feature, MFCC (Mel-Frequency Cepstral Coefficient) which is widely used in the speech and speaker recognition, is introduced. MFCC, as an acoustic feature derived by the promotion of the study results on the human auditory system, taking the auditory characters of human ear into consideration, transforms the spectrum to the Mel-Frequency scale based non-linear spectrum, which is in turn converted to the cepstrum domain, thereby well simulating human's auditory characters.

The extraction process of MFCC is as follows: first, the utterance is fast-fourier transformed from the time domain to the frequency domain; then the convolution of logarithm energy spectrum thereof is obtained by using the triangle filter-bank with Mel-scale; and finally the energy vector formed by the outputs of the respective filters is discrete cosine transformed, and the first N coefficients thereof are taken.

However, the shortcoming in the use of MFCC is that a fixed filter-bank rather than an adaptive filter-bank dependent on the speaker is used. In the phase of verification, the distortion measure between a test utterance and a speaker template is often assumed as symmetric distance functions like Euclidean, Mahalanobis distances and so on. Both fixed filter-bank and symmetric distance ignore the intrinsic detailed spectral structure of particular signal or template. This is a waste of a priori information especially for binary decision problem like text-dependent speaker verification.

SUMMARY OF THE INVENTION

In order to solve the above-mentioned problems in the prior technology, the present invention provides a method and apparatus for enrollment of speaker authentication, a method and apparatus for verification of speaker authentication, and a system for speaker authentication.

According to an aspect of the present invention, there is provided a method for enrollment of speaker authentication, comprising: extracting an acoustic feature vector sequence from an enrollment utterance of a speaker; and generating a speaker template using the acoustic feature vector sequence; wherein said step of extracting an acoustic feature vector sequence comprises: generating a filter-bank for the enrollment utterance of the speaker for filtering locations and energies of formants in the spectrum of the enrollment utterance based on the enrollment utterance; filtering the spectrum of the enrollment utterance by the generated filter-bank; and generating the acoustic feature vector sequence from the filtered enrollment utterance.

According to another aspect of the present invention, there is provided a method for verification of speaker authentication, comprising: extracting an acoustic feature vector sequence from an incoming utterance; and determining whether the incoming utterance is an utterance of enrolled password spoken by the speaker, based on a speaker template and the extracted acoustic feature vector sequence; wherein the speaker template is generated by using the method for enrollment of speaker authentication according to any one of the preceding claims; and said step of extracting a acoustic feature vector sequence from an incoming utterance comprises: filtering the spectrum of the incoming utterance by using the filter-bank generated for the enrollment utterance of the speaker during enrollment; and generating the acoustic feature vector sequence from the filtered incoming utterance.

According to another aspect of the present invention, there is provided an apparatus for enrollment of speaker authentication, comprising: an utterance input unit configured to input an enrollment utterance containing a password that is spoken by a speaker; an acoustic feature extractor configured to extract an acoustic feature vector sequence from said enrollment utterance; and a template generator configured to generate a speaker template using the acoustic feature vector sequence; wherein the acoustic feature extractor comprises: a filter-bank generator configured to generate a filter-bank for the enrollment utterance of the speaker based on the enrollment utterance; and a filtering unit configured to filter the spectrum of the enrollment utterance with the generated filter-bank for the enrollment utterance.

According to another aspect of the present invention, there is provided an apparatus for verification of speaker authentication, comprising: an utterance input unit configured to input an utterance; an acoustic feature extractor configured to extract an acoustic feature vector sequence from the incoming utterance; and a determination unit configured to determine whether the incoming utterance is an utterance of enrolled password spoken by the speaker through comparing an enrolled speaker template with the extracted acoustic feature vector sequence, wherein the enrolled speaker template is generated by using the method for enrollment of speaker authentication as described above 241951; wherein the acoustic feature extractor comprising: a filtering unit configured to filter the spectrum of the incoming utterance by using the filter-bank generated for the enrollment utterance of the speaker during the enrollment.

According to another aspect of the present invention, there is provided a system for speaker authentication, comprising: an apparatus for enrollment of speaker authentication mentioned above; and an apparatus for verification of speaker authentication mentioned above.

BRIEF DESCRIPTION OF THE DRAWINGS

It is believed that through the following detailed description of the embodiments of the present invention, taken in conjunction with the drawings, the above-mentioned features, advantages, and objectives of the present invention will be better understood.

DETAILED DESCRIPTION OF THE INVENTION

Next, a detailed description of each preferred embodiment of the present invention will be given with reference to the drawings.

Figure 1:
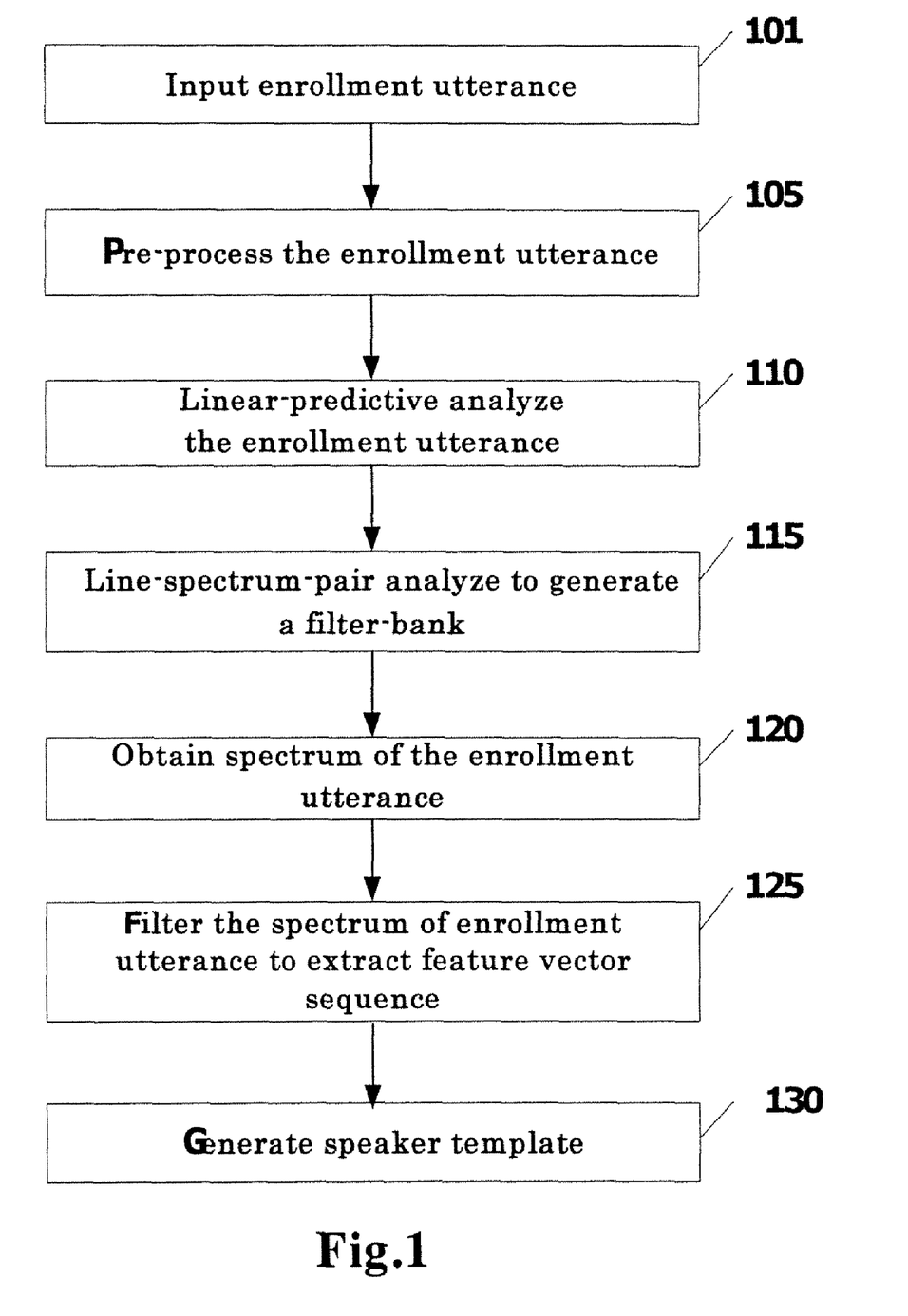
FIG. 1 is a flowchart showing a method for enrollment of speaker authentication according to one embodiment of the present invention.

FIG. 1 is a flowchart showing a method for enrollment of speaker authentication according to one embodiment of the present invention. As shown in FIG. 1, first in Step 101, an utterance containing a password spoken by a speaker is inputted. Here, the password is specific phrase or pronunciation sequence for verification set by a user during the phase of enrollment.

In Step 105, said enrollment utterance spoken by the speaker is pre-processed.

In this step, the enrollment utterance is conventionally pre-processed, for example, first the enrollment utterance is analog-digital converted, then is framed, and as the noisy enrollment utterance signal, it is filtered to become the clean signal. Afterwards, the enrollment utterance is filtered out the low frequency interference by using pre-weighting technology, and the filtered utterance data is calculated out the short-time energy and the short-time zero-crossing rate thereof, and, by detecting the short-time energy and the short-time zero-crossing rate of the utterance data, silence, white noise, and surd is eliminated while effective sonant remains. As to the pre-processing of utterance signal, referring to the article "Signal Modeling Techniques in Speech Recognition" by J. W. Picone (Proceedings of the IEEE, 1993, 81(9): 1215-1247), the procedure of the pre-processing of utterance signal is described in detail therein.

In Step 110, each frame of the pre-processed enrollment utterance is Linear-Predictive-Coding analyzed to obtain the Linear-Predictive-Coding coefficient vector of the frame.

Linear-Predictive-Coding Analysis is also referred to as Linear-Predictive-Coding, shortened as LPC. More exactly, Linear Predictive Coding means optimal linear one-step-ahead pure predicting, which is able to represent the waveform of a utterance signal by a few time-varying parameters with low information rate, and precisely estimate utterance parameters (such as, fundamental tone frequency, formant, power spectrum, or the like).

In this step, the spectrum peak of the enrollment utterance is estimated with the LPC analysis, thereby estimating the utterance parameter (mainly formant in the present embodiment) of the enrollment utterance. In particular, in this step, each frame in the enrollment utterance (in general the sampling frequency of utterance signal is 8 kHz, typical frame length is 10-30 ms) is LPC-analyzed to obtain the LPC coefficient vector characterizing the utterance parameter of the frame.

As well-known by those skilled in the art, the Linear Predictive Coding analysis on utterance commonly comprises: with respect to each sampling value of main utterance signal, it is represented by the weight sum (linear combination) of several past sampling values; the principle of the determination of respective weighting coefficients is to make the mean square value of predicted error minimal (i.e. following so-called least mean square rule), wherein the predicted error is the difference between the actual sampling value and the predicted value.

Concerning the Linear Predictive Coding analysis, please refer to, for example, the article "A Study of Line Spectrum Pair Frequency Representation for Speech Recognition" by Fikret Gurgen, Shigeki Sagayama, Sadaoki Furui (IEICE Trans. Fundamentals, Vol. E75-A, No. 1, January 1992, 98-102).

Next, in Step 115, a filter-bank is generated for said enrollment utterance. In the present embodiment, the linear predictive coding coefficient vector of each frame in the enrollment utterance obtained above is LSP (Line Spectrum Pair) analyzed to obtain the line spectrum pair of the frame, and such line spectrum pairs are formed to a line spectrum pair group, as the filter-bank for the enrollment utterance.

LSP may be viewed as an alternative representation of the LPC spectrum of utterance data. The LSP coefficients may be obtained from the LPC prediction coefficients by combining the forward and backward predictor polynomials as follows:

$$P(z)=A(z)+B(z), Q(z)=A(z)-B(z)$$

wherein, the resulting polynomials $P(z)$ and $Q(z)$ are symmetric and antisymmetric, respectively, with a root of $P(z)$ at $z=+1$, and a root of $Q(z)$ at $z=-1$. The remainder of the roots of P and Q all lie on the unit circle in Z field, and they occur in conjugate pairs. The angles of the roots, {oi, i=1,2, ..., M}, are called the line spectrum pairs (LSP).

Concerning the LSP analysis, please also refer to the article "A Study of Line Spectrum Pair Frequency Representation for Speech Recognition" by Fikret Gurgen, Shigeki Sagayama, Sadaoki Furui (IEICE Trans. Fundamentals, Vol. E75-A, No. 1, January 1992, 98-102).

Then, in Step 120, the spectrum of said pre-processed enrollment utterance data is obtained. In particular, in this step, each frame of the enrollment utterance data, which is pre-processed in Step 105, is Fast-Fourier transformed, thereby obtaining the frame spectrums of the frame. Combining the frame spectrums of each frame will form the spectrum of the enrollment utterance.

In Step 125, said spectrum of enrollment utterance is filtered. In particular, in this step, the frame spectrums of each frame in the enrollment utterance data is filtered by the filter-bank obtained in Step 115, i.e. the line spectrum pair group. Since the line spectrum pair group is derived from the linear predictive analysis on the enrollment utterance, and the line spectrum pairs therein precisely depict the locations of formants in the spectrum of the enrollment utterance data, and the intervals of line spectrum pairs depict the intensity of formants, in this step, an acoustic feature vector in the form of "location+intensity" of formant is extracted from each frame in the enrollment utterance by filtering the frame spectrums of the frame by using such line spectrum pair group. The acoustic feature vectors of all frames form an acoustic feature vector sequence of the enrollment utterance.

Next, in Step 130, a speaker template is generated for the enrollment utterance. In particular, in this embodiment, the speaker template comprises said extracted acoustic feature vector sequence and the discriminating threshold set for the utterance. Herein, the way of generating the speaker template is not specifically restricted in the present invention, and any methods known in the art capable of generating a speaker template based on acoustic features could be applied.

The detailed description of the method for enrollment of speaker authentication according to the present embodiment is as above. It should be noted that, in the present embodiment, Step 120 is shown to be performed after Step 110 and 115, however, the present embodiment is not intended to be limited to such implementation manner. Instead, in the practical implementation, Step 120 may be performed prior to Step 110 and 115, or may be performed at the same time with Step 110, 115. Such implementations could also achieve the objectives of the present invention.

It should also be noted that said enrollment process of speaker authentication is for one enrollment utterance. In the practical implementation, in order to make the extracted acoustic features of the enrollment utterance more accurate, training of enrollment utterances is often needed. That is, the feature extraction is performed on a plurality of enrollment utterances of a speaker, respectively, and a plurality of extracted acoustic feature groups (speaker templates) are merged. When merging the templates, a DTW-based template mergence method, for example, may be applied, and the detailed content could be referred to the article "Cross-words reference template for DTW-based speech recognition systems" by W. H. Abdulla, D. Chow, and G. Sin (IEEE TENCON 2003, pp. 1576-1579).

In the case of a plurality of enrollment utterances, according to the present embodiment, in addition to the mergence of the acoustic features (speaker templates), the filter-banks generated respectively by respective feature extraction processes should also be merged and saved after the feature extraction processes, in order to be used in the verification process. In the present embodiment, the following methods may be taken for the mergence of the filter-banks: taking the average of the plurality of filter-banks; taking the filter-bank whose location ranges of formants characterized therein are narrowest in the plurality of filter-banks; taking the filter-bank whose location ranges of formants characterized therein are widest in the plurality of filter-banks; and so on.

Figure 2:
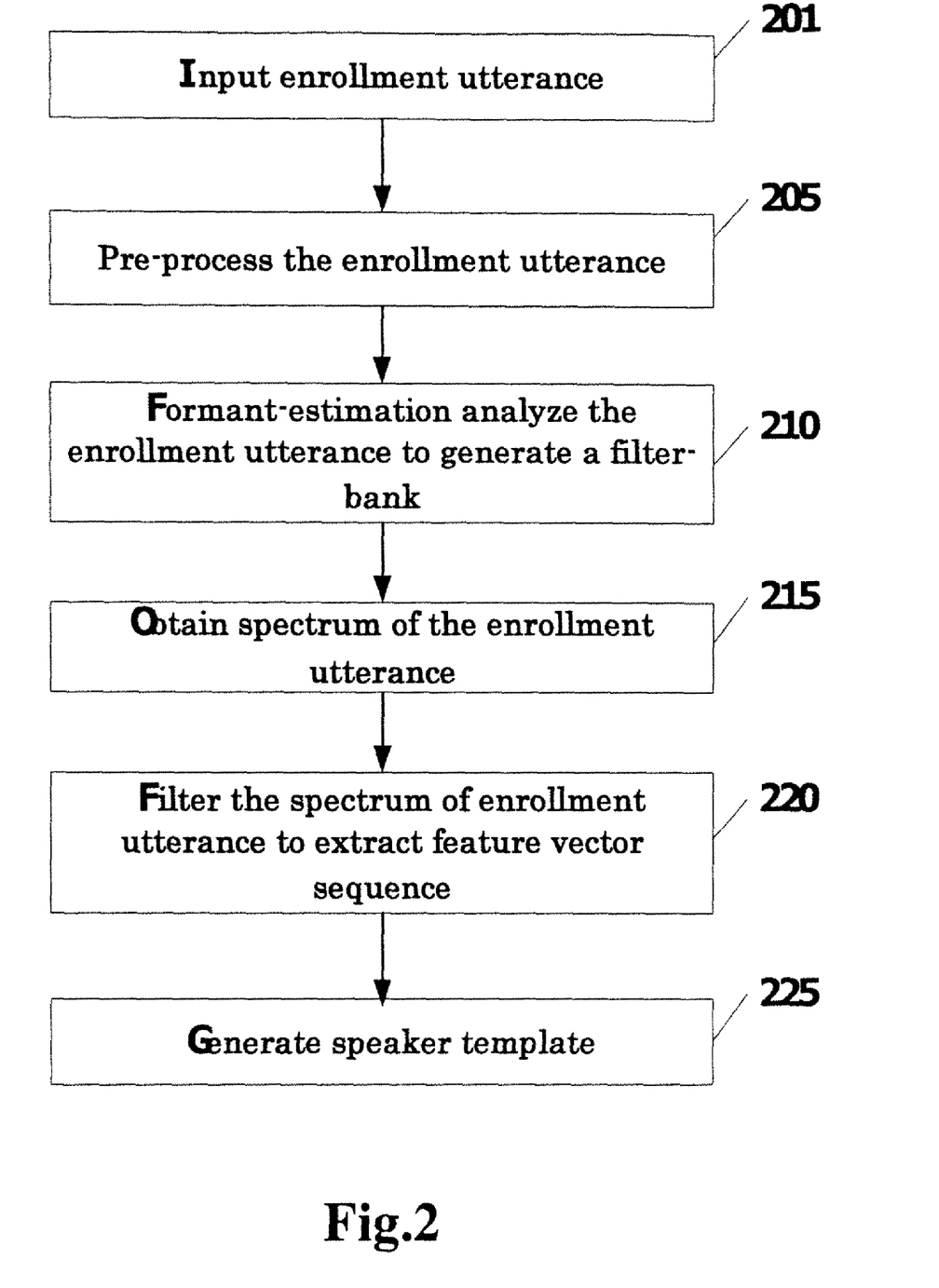
FIG. 2 is a flowchart showing a method for enrollment of speaker authentication according to another embodiment of the present invention.

FIG. 2 is a flowchart showing a method for enrollment of speaker authentication according to another embodiment of the present invention. The description of the present embodiment will be given below in conjunction with FIG. 2, with a proper omission of the same parts as those in the above-mentioned embodiment.

The difference of the present embodiment and that shown in FIG. 1 is in that the method for generating filter-bank upon the feature extraction of the enrollment utterance, thus the generated filter-bank, are different.

As shown in FIG. 2, Step 201 and 205 are substantially the same as those of the embodiment shown in FIG. 1. Next, in Step 210, each frame of said enrollment utterance is formant-predictive analyzed to obtain the formant location vector of the frame. Concerning the formant predictive analysis, please refer to the article "Formant Estimation for Speech Recognition" by L Welling, H Ney (IEEE Transaction on Speech and Audio Processing, vol. 6, NO. 1, JANUARY 1998) and the article "Formant Estimation Method Using Inverse-Filter Control" by A Watanabe (IEEE Transactions on Speech and Audio Processing, VOL. 9, NO. 4, MAY 2001). In the present embodiment, the formant location vector of each frame in the enrollment utterance obtained above is formed to a formant location vector group, as the filter-bank for the enrollment utterance.

Step 215 is the same as the above Step 120 in the embodiment shown in FIG. 1, where each frame in the enrollment utterance data is Fast-Fourier transformed, thereby obtaining the frame spectrum of the frame.

In Step 220, the frame spectrum of each frame in the enrollment utterance is filtered. In particular, the frame spectrums of each frame in the enrollment utterance are filtered by the filter-bank (the formant location vector group in the present embodiment) obtained in Step 210, thereby obtaining the acoustic feature vector of the frame depicting the location of a formant. And the acoustic feature vectors of all frames are formed to a acoustic feature vector sequence of the enrollment utterance.

The following Step 225 is the same as Step 130 in the embodiment shown above in FIG. 1, where a speaker template is generated for the enrollment utterance.

Similarly, in the present embodiment, Step 215 is shown to be performed after Step 210, however, the present invention is not intended to be limited to such implementation manner. Instead, in the practical implementation, Step 215 may be performed prior to Step 210, or may be performed at the same time with Step 210.

According to the present embodiment, it may also perform the training of enrollment utterance, that is, the feature extraction is performed on a plurality of enrollment utterances of a speaker, respectively, and a plurality of extracted acoustic features groups (speaker templates) are merged. In this case, according to the present embodiment, in addition to the mergence of respective acoustic feature sequences (speaker templates), the filter-banks generated respectively by respective feature extraction processes should also be merged and saved after the feature extraction processes, in order to be used in the verification process.

Figure 3:
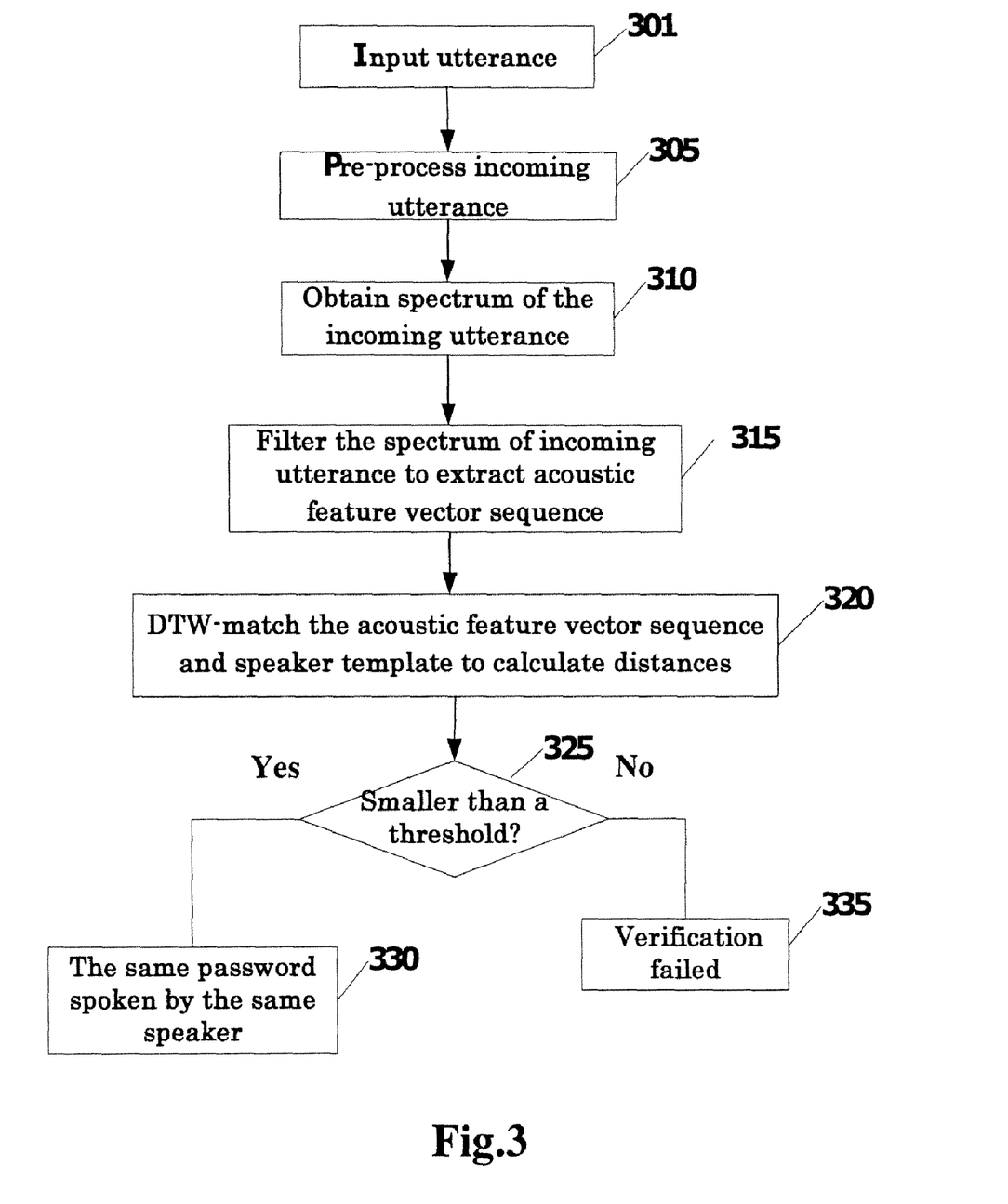
FIG. 3 is a flowchart showing a method for verification of speaker authentication according to one embodiment of the present invention.

FIG. 3 is a flowchart showing a method for verification of speaker authentication according to one embodiment of the present invention. The present embodiment will be described below in combination with FIG. 3.

In Step 301, an utterance to be verified is inputted.

In Step 305, the incoming utterance is pre-processed. The way of the pre-processing on the incoming utterance in this step is the same as the way of the pre-processing on the enrollment utterance in the embodiment shown above in FIG. 1, and therefore will not be described repeatedly any more.

In Step 310, the spectrum of said pre-processed incoming utterance is obtained. In particular, in this step, each frame in said pre-processed incoming utterance is Fast-Fourier transformed, thereby obtaining the frame spectrum of each frame in the incoming utterance data. Combining the frame spectrums of all frames will form the spectrum of the incoming utterance.

In Step 315, said spectrum of the incoming utterance is filtered. In particular, in this step, the frame spectrums of each frame in the incoming utterance data is filtered by utilizing the filter-bank generated for the enrollment utterance from the speaker himself in the enrollment phase (which is the line spectrum pair group in the case of the enrollment method shown in FIG. 1, or which is the formant location vector group in the case of the enrollment method shown in FIG. 2). Through filtering, an acoustic feature vector in the form of "location+intensity" of formant is extracted from each frame in the incoming utterance. The acoustic feature vectors of all frames form an acoustic feature vector sequence of the incoming utterance.

Figure 4:
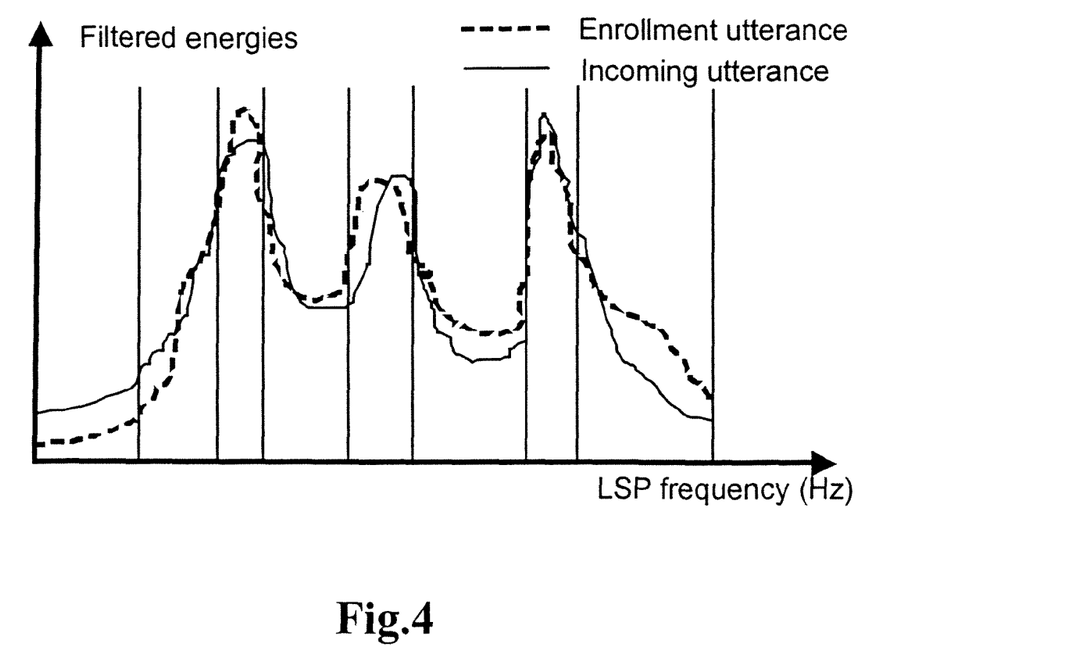
FIG. 4 is a comparison diagram of an exemplary enrollment utterance and an incoming utterance characterized with the acoustic features of the present invention.

Next, in Step 320, the acoustic feature vector sequence and the speaker template are DTW-matched to calculate distances. As the conventional process of speaker authentication, the process of calculating distances is usually as follows:

(1) All node distance (local distance) between frames in the acoustic feature vector sequence and frames in the speaker template are calculated. FIG. 4 shows a pair of corresponding frames of an exemplary incoming utterance data and a speaker template which are characterized by the acoustic features according to the present invention. Since the acoustic features according to the present invention are in the form of "location+intensity" of formants, the calculation of the distance between the speaker template and the incoming utterance data according to the present invention is performed on the differences of the "intensity (energy)" between them. In particular, in this step, the energy difference between the speaker template and the incoming utterance data in one band is calculated, and the calculated energy differences in all bands are summed, to obtain the distance between a pair of frame nodes.

(2) Based on said calculated node distance, the acoustic feature vector sequence and the speaker template are DTW-matched to obtain the optimum matching path.

(3) The global distance between the acoustic feature vector sequence and the speaker template (the sum of all node distances on the optimum matching path) is calculated.

Here it should be noted that the calculation of the matching distance between the acoustic feature vector sequence and the speaker template is not specifically restricted in the present invention, so that various means and improved ones at present and in future may be applied, for example, various linear, non-linear transformations may be applied when calculating local distance and global distance, thereby further improving the reliability of authentication.

Next, in Step 325, a decision is made as to whether the global distance is smaller than a preset threshold. If so, then the same password spoken by the same speaker is confirmed in Step 330, and the verification succeeds; if not, then it is considered that the verification is unsuccessful in Step 335.

In the present embodiment, the distortion measure of the incoming utterance and the enrollment utterance is accomplished by calculating the asymmetric distortion caused by changing the enrollment utterance into the incoming utterance data. It is more precise in practice and more reasonable in theory than the traditional distance functions. The asymmetric distortion measure according to the present embodiment is equal to some kind of "Kullback discrimination information" or "directed divergence". The final decision based on the proposed distortion measure is consistent with the Minimum Discrimination Information theory. Concerning the Minimum Discrimination Information theory, please refer to "Fundamentals of Applied Information Theory" (Chapter 7, Tsinghua University Press, Beijing, 2000) by X. L. Zhu.

In general, the enrollment utterance data is low at noise, and it is typically obtained through multi-times of training, therefore it may be considered as clean utterance. And in the verification process, the incoming utterance is inputted under a practical situation, therefore noise pollution occurs inescapably. According to the present embodiment, the filter-bank used in the verification phase is generated based on the enrollment utterance instead of the incoming utterance, therefore the filtering process will not be influenced by the noise embedded in the incoming utterance data. That is, in the present embodiment, the noisy incoming utterance data is decomposed by the priori spectrum structure of the clean enrollment data. Thus, the present embodiment well utilizes a priori information in the clean enrollment data and provides the robustness for environmental noise.

Further, in the present embodiment, it is able to provide a precise description of spectral structure by decomposing formant peak location and formant intensity.

Figure 5:
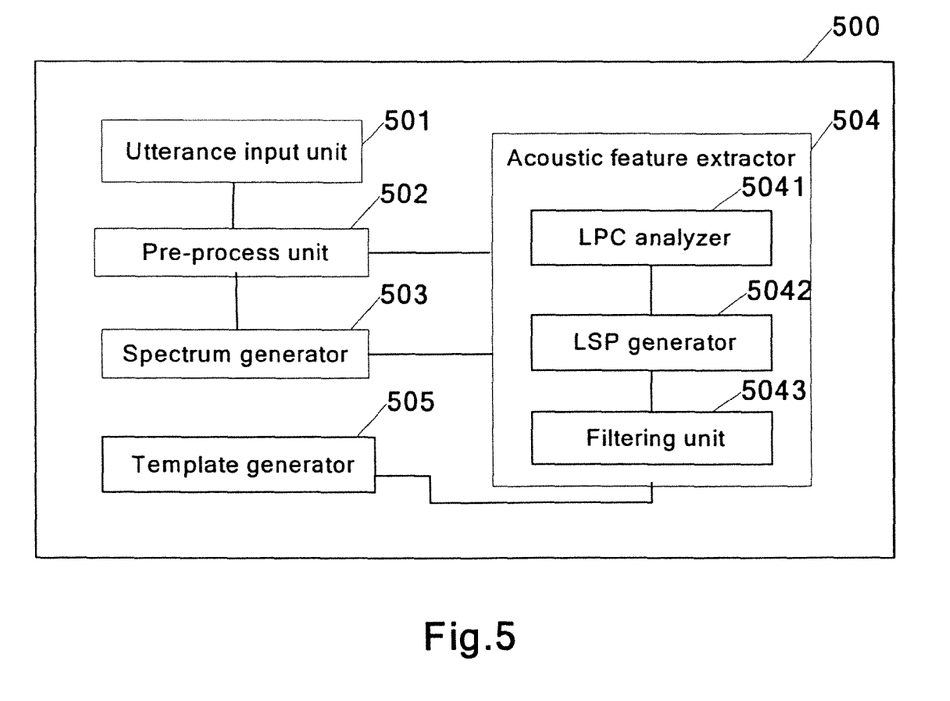
FIG. 5 is a flow chart showing an apparatus for enrollment of speaker authentication according to one embodiment of the present invention.

Under the same inventive concept, FIG. 5 is a block diagram showing an apparatus for enrollment of speaker authentication according to one embodiment of the present invention. The present embodiment will be described below in combination with FIG. 5. As shown in FIG. 5, the apparatus 500 for enrollment of speaker authentication according to the present embodiment comprises: an utterance input unit 501 configured to input an enrollment utterance containing a password spoken by a speaker; a pre-process unit 502 configured to conventionally pre-process the enrollment utterance inputted through the utterance input unit 501; a spectrum generator 503 configured to Fast-Fourier transform each frame in the enrollment utterance pre-processed by the pre-process unit 502, thereby obtaining the frame spectrum of the frame, with the frame spectrums of all frames combining to form the spectrum of the enrollment utterance; an acoustic feature extractor 504 configured to extract an acoustic feature vector sequence from the enrollment utterance, characterized by the spectrum, obtained by the spectrum generator 503; a template generator 505 configured to generate a speaker template using the acoustic feature vector sequence extracted by the acoustic feature extractor 504.

As shown in FIG. 5, said acoustic feature extractor 504 further comprises: an LPC analyzer 5041 configured to LPC-analyz each frame in the enrollment utterance processed by the pre-process unit 502 to obtain an linear predictive coefficient vector of the frame; an LSP generator 5042 configured to calculate the line spectrum pair of each frame based on the linear predictive coefficient vector of the frame generated by the LPC analyzer 5041, with line spectrum pairs of all frames forming a line spectrum pair group, as the filter-bank for the enrollment utterance; a filtering unit 5043 configured to filter the spectrum of the enrollment utterance obtained by the spectrum generator 503 with the filter-bank for the enrollment utterance (i.e. the line spectrum pair group) generated by the LSP generator 5042, thereby obtaining the acoustic features of the enrollment utterance.

In the present embodiment, the extracted acoustic features are in the form of "location+intensity" of formants. When generating a speaker template by utilizing the enrollment utterance, in order to make the extracted acoustic features of the enrollment utterance more accurate, the training of enrollment utterance is often performed, that is, the feature extraction is performed on a plurality of enrollment utterances of a speaker, respectively, and a plurality of extracted acoustic features groups (speaker templates) are merged. In this case, according to the present embodiment, in addition to the mergence of the respective acoustic features sequences (speaker templates), the filter-banks generated respectively for different utterances from a same speaker by the acoustic feature extractor should also be merged and saved after the feature extraction processes, in order to be used in the verification process.

The apparatus 500 for enrollment of speaker authentication according to the present embodiment and its various components can be constructed with specialized circuits or chips, and can also be implemented by executing corresponding programs through a computer (processor). And the apparatus 500 for enrollment of speaker authentication in the present embodiment can operationally implement the method for enrollment of speaker authentication in the embodiment of FIG. 1.

Figure 6:
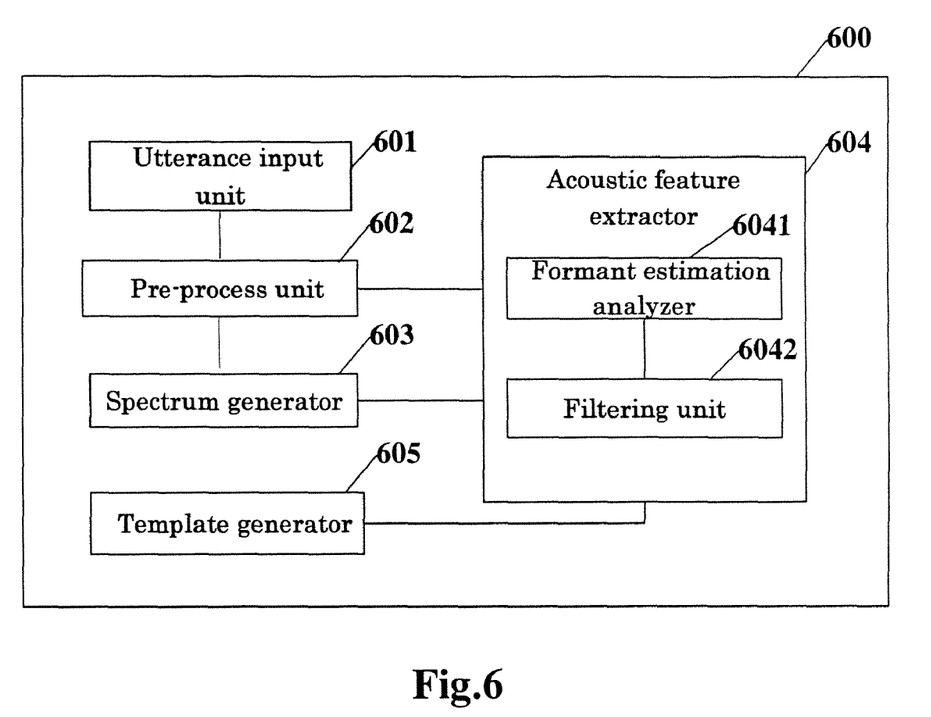
FIG. 6 is a block diagram showing an apparatus for enrollment of speaker authentication according to another embodiment of the present invention.

FIG. 6 is a block diagram showing an apparatus for enrollment of speaker authentication according to another embodiment of the present invention. The present embodiment will be described in combination to FIG. 6. The description of the parts similar to those in the above embodiments is omitted as appropriate.

The structure of the apparatus 600 for utterance enrollment according to the present embodiment is the same as that in FIG. 5, except that the acoustic feature extractor 604 is different from the acoustic feature extractor 504. The acoustic feature extractor 604 in the present embodiment comprises: a formant estimation analyzer 6041 configured to analyze each frame in the enrollment utterance processed by the pre-process unit 602 by using the formant estimation analysis to obtain a formant location vector of the frame, with the formant location vectors of all frame forming a formant location vector group, as the filter-bank for the enrollment utterance; a filtering unit 6042 configured to filter the spectrums of the enrollment utterance obtained by the spectrum generator 603 with the filter-bank (the formant location vector group) for the enrollment utterance generated by the formant estimation analyzer 6041, thereby obtaining the acoustic features of the enrollment utterance.

In the present embodiment, the extracted acoustic features are also in the form of "locations+intensities". The apparatus 600 for enrollment of speaker authentication according to the present embodiment and its various components can be constructed with specialized circuits or chips, and can also be implemented by executing corresponding programs through a computer (processor). And the apparatus 600 for enrollment of speaker authentication in the present embodiment can operationally implement the method for enrollment of speaker authentication in the embodiment of FIG. 2.

Figure 7:
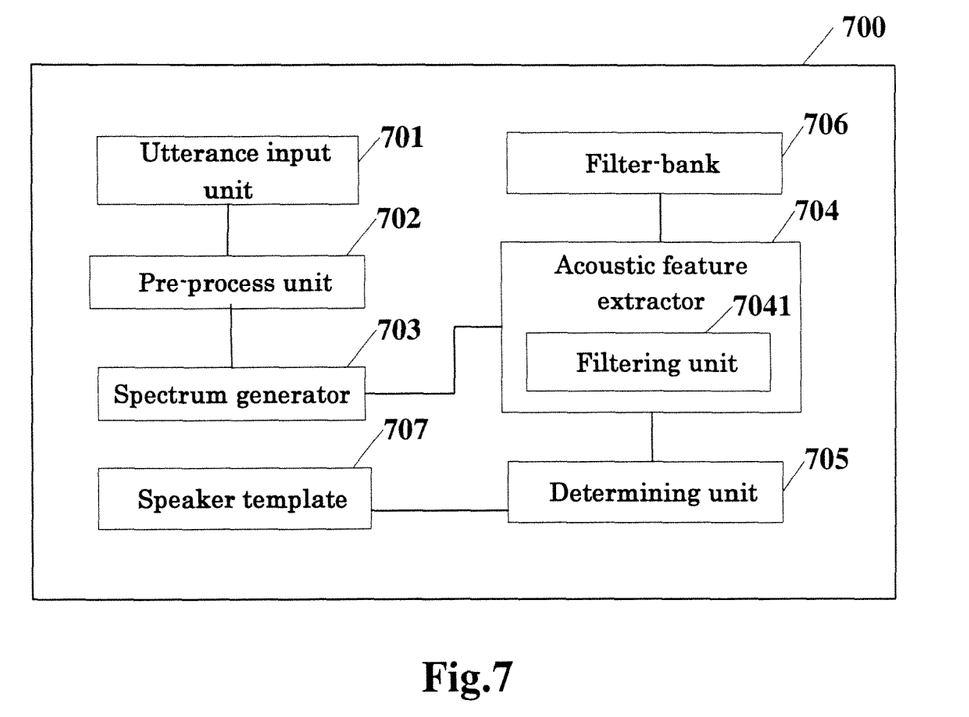
FIG. 7 is a block diagram showing an apparatus for verification of speaker authentication according to one embodiment of the present invention.

Under the same inventive concept, FIG. 7 is a block diagram showing an apparatus for verification of speaker authentication according to one embodiment of the present invention. The present embodiment will be described in combination to FIG. 7.

As shown in FIG. 7, the apparatus 700 for verification of speaker authentication according to the present embodiment comprises: an utterance input unit 701 configured to input an utterance; a pre-process unit 702 configured to conventionally pre-process the incoming utterance inputted through the utterance input unit 701; a spectrum generator 703 configured to Fast-Fourier transform each frame of the incoming utterance processed by the pre-process unit 702, thereby obtaining the frame spectrums of the frame, with the frame spectrums of all frames combining to form the spectrum of the incoming utterance; an acoustic feature extractor 704 configured to extract the acoustic feature vector sequence based on the incoming utterance, characterized by the spectrum, obtained by said spectrum generator 703; an determining unit 705 configured to determine whether said incoming utterance is an utterance of enrolled password spoken by the speaker through comparing an enrolled speaker template 707 with the utterance feature vector sequence extracted by the acoustic feature extractor 704, wherein the enrolled speaker template 707 is generated by utilizing the method for enrollment of speaker authentication shown above in FIG. 1 or FIG. 2.

As shown in FIG. 7, the acoustic feature extractor 704 further comprises: a filtering unit configured to filter the spectrum of said incoming utterance by utilizing the filter-bank 706 (the line spectrum pair group or the formant location vector group) generated for the enrollment utterance of the speaker himself during the enrollment to extract the acoustic features.

When comparing the acoustic features of the incoming utterance with the speaker template generated based on the enrollment utterance during enrollment, the determining unit 705 in the present embodiment calculates the distortion between the incoming utterance and the enrollment utterance, and determines whether the distortion is smaller than a preset threshold. If so, then the same password spoken by the same speaker is confirmed, and the verification succeeds; if not, then it is considered that the verification is unsuccessful.

The apparatus 700 for verification of speaker authentication according to the present embodiment and its various components can be constructed with specialized circuits or chips, and can also be implemented by executing the corresponding programs through a computer (processor). And the apparatus 700 for verification of speaker authentication in the present embodiment can operationally implement the method for verification of speaker authentication in the embodiment described above in combination with of FIG. 3.

According to the present embodiment, the filter-bank used in the verification phase is generated based on the enrollment utterance instead of the incoming utterance, therefore the filtering process will not be influenced by the noise embedded in the incoming utterance data. That is, in the present embodiment, the noisy incoming utterance data is decomposed by the priori spectrum structure of the clean enrollment data.

Figure 8:
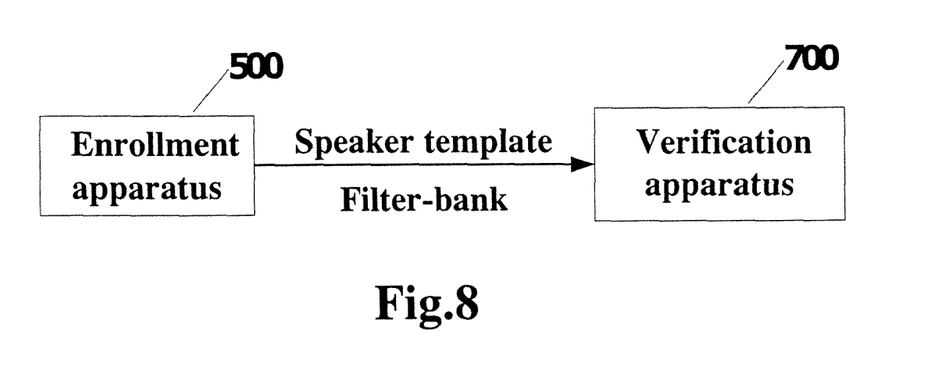
FIG. 8 is a block diagram showing a system for speaker authentication according to one embodiment of the present invention.

Under the same inventive concept, FIG. 8 is a block diagram showing a system for speaker authentication according to one embodiment of the present invention. The present embodiment will be described below in combination with FIG. 8.

As shown in FIG. 8, the system for speaker authentication according to the present embodiment comprises: an apparatus for enrollment 500, which may be the apparatus for enrollment 500 of speaker authentication mentioned in the above embodiments; and an apparatus for verification 700, which may be the apparatus for verification 700 of speaker authentication mentioned in the above embodiments. The speaker template and the filter-bank generated by the apparatus for enrollment 500 are transferred to the apparatus for verification 700 by any communication means, such as a network, an internal channel, a disk or other recording media, etc. The apparatus for verification 700 extracts the acoustic features of the incoming utterance with the filter-bank, and based on the extracted acoustic features of the incoming utterance, it performs the distortion measure with the speaker template thereby making a decision as to whether the incoming utterance and the enrollment utterance is the same password spoken by the same speaker, so as to accomplish the corresponding authentication.

Although a method and apparatus for enrollment of speaker authentication, a method and apparatus for verification of speaker authentication, and a system for speaker authentication have been described in details with some exemplary embodiments, these embodiments are not exhaustive. Those skilled in the art may make various variations and modifications within the spirit and scope of the present invention. Therefore, the present invention is not limited to these embodiments; rather, the scope of the present invention is only defined by the appended claims.

The invention claimed is:

1. A method for enrollment of speaker authentication, comprising:
    extracting an acoustic feature vector sequence from an enrollment utterance of a speaker; and
    generating a speaker template using the acoustic feature vector sequence;
    wherein said step of extracting an acoustic feature vector sequence comprises:
        generating a filter-bank for the enrollment utterance of the speaker for filtering locations and energies of formants in the spectrum of the enrollment utterance based on the enrollment utterance;
        filtering the spectrum of the enrollment utterance by the generated filter-bank; and
        generating the acoustic feature vector sequence from the filtered enrollment utterance,
        wherein said step of generating a filter-bank for the enrollment utterance comprises:
        LPC-analyzing each frame in the enrollment utterance to obtain an LPC coefficient vector of the frame;
        LSP-analyzing the obtained LPC coefficient vector of each frame to obtain line spectrum pairs (LSP) of the frame; and
        combining the LSPs of all frames in the enrollment utterance as the filter-bank for the enrollment utterance.

2. A method for enrollment of speaker authentication comprising:
    extracting an acoustic feature vector sequence from an enrollment utterance of a speaker; and
    generating a speaker template using the acoustic feature vector sequence,
    wherein said step of extracting an acoustic feature vector sequence comprises:
        generating a filter-bank for the enrollment utterance of the speaker for filtering locations and energies of formants in the spectrum of the enrollment utterance based on the enrollment utterance;
        filtering the spectrum of the enrollment utterance by the generated filter-bank; and
        generating the acoustic feature vector sequence from the filtered enrollment utterance,
        wherein said step of generating a filter-bank for the enrollment utterance comprises:
        analyzing each frame in the enrollment utterance by using a formant estimation method to obtain a formant location vector of the frame; and
        combining the formant location vectors of all frames in the enrollment utterance as the filter-bank.

3. The method for enrollment of speaker authentication according to claim 1 or claim 2, wherein said step of filtering the spectrum of the enrollment utterance comprises: fast-Fourier transforming each frame in the enrollment utterance to obtain a frame-spectrum of the frame; and filtering the frame-spectrum of each frame with the filter-bank.

4. The method for enrollment of speaker authentication according to claim 1 or claim 2, wherein said step of extracting a acoustic feature vector sequence from an enrollment utterance of a speaker comprises: extracting a plurality of acoustic feature vector sequences from a plurality of enrollment utterances of a speaker;
    wherein said step of generating a speaker template comprises: merging said plurality of acoustic feature vector sequences extracted to generate said speaker template.

5. The method for enrollment of speaker authentication according to claim 4, wherein with respect to said each enrollment utterance, a filter bank is generated for filtering the spectrum of said enrollment utterance, said method further comprises: merging a plurality of filter-banks generated for said plurality of enrollment utterances of the speaker respectively.

6. A method for verification of speaker authentication, comprising:
    extracting an acoustic feature vector sequence from an incoming utterance; and
    determining whether the incoming utterance is an utterance of enrolled password spoken by the speaker, based on a speaker template and the extracted acoustic feature vector sequence;
    wherein the speaker template is generated by using the method for enrollment of speaker authentication according to claim 1 or claim 2; and
    wherein said step of extracting a acoustic feature vector sequence from an incoming utterance comprises:
    filtering the spectrum of the incoming utterance by using the filter-bank generated for the enrollment utterance of the speaker during enrollment; and
    generating the acoustic feature vector sequence from the filtered incoming utterance
    wherein the filter-bank includes line spectrum pairs of the enrollment utterance of the speaker generated during the enrollment.

7. The method for verification of speaker authentication according to claim 6, wherein said step of filtering the spectrum of the incoming utterance comprises: fast-Fourier transforming each frame in the incoming utterance to obtain a frame-spectrum of each frame in the incoming utterance; and filtering the frame-spectrum of each frame in the incoming utterance with the filter-bank generated for the enrollment utterance of the speaker during the enrollment.

8. An apparatus for verification of speaker authentication, comprising:
    an utterance input unit configured to input an utterance;
    an acoustic feature extractor configured to extract an acoustic feature vector sequence from the incoming utterance; and
    a determination unit configured to determine whether the incoming utterance is an utterance of enrolled password spoken by the speaker through comparing an enrolled speaker template with the extracted acoustic feature vector sequence, wherein the enrolled speaker template is generated by using the method for enrollment of speaker authentication according to claim 1 or claim 2;

wherein the acoustic feature extractor comprises:
a filtering unit configured to filter the spectrum of the incoming utterance by using the filter-bank generated for the enrollment utterance of the speaker during the enrollment;
wherein the filter-bank includes line spectrum pairs of the enrollment utterance of the speaker generated during the enrollment.

9. The apparatus for verification of speaker authentication according to claim 8, further comprising: a spectrum generator configured to obtain the spectrum of the incoming utterance.

10. The apparatus for verification of speaker authentication according to claim 9, wherein the spectrum generator fast-Fourier transforms each frame in the incoming utterance to obtain a frame-spectrum of the frame.

11. An apparatus for enrollment of speaker authentication, comprising:
an utterance input unit configured to input an enrollment utterance containing a password that is spoken by a speaker; an acoustic feature extractor configured to extract an acoustic feature vector sequence from said enrollment utterance; and
a template generator configured to generate a speaker template using the acoustic feature vector sequence;
wherein the acoustic feature extractor comprises:
a filter-bank generator configured to generate a filter-bank for the enrollment utterance of the speaker based on the enrollment utterance; and
a filtering unit configured to filter the spectrum of the enrollment utterance with the generated filter-bank for the enrollment utterance,
wherein said filter-bank generator comprises: an LPC analyzer configured to LPC-analyze each frame in the enrollment utterance to obtain an LPC coefficient vector of the frame; and an LSP generator configured to LSP-analyze the obtained LPC coefficient vector of said each frame to obtain line spectrum pairs (LSP) of the frame.

12. An apparatus for enrollment of speaker authentication comprising:
an utterance input unit configured to input an enrollment utterance containing a password that is spoken by a speaker; an acoustic feature extractor configured to extract an acoustic feature vector sequence from said enrollment utterance; and
a template generator configured to generate a speaker template using the acoustic feature vector sequence;
wherein the acoustic feature extractor comprises:
a filter-bank generator configured to generate a filter-bank for the enrollment utterance of the speaker based on the enrollment utterance; and
a filtering unit configured to filter the spectrum of the enrollment utterance with the generated filter-bank for the enrollment utterance,
wherein said filter-bank generator comprises: a formant estimation analyzer configured to analyze each frame in the enrollment utterance by using a formant estimation method to obtain a formant location vector of the frame.

13. The apparatus for enrollment of speaker authentication according to claim 11 or claim 12, further comprising: a spectrum generator configured to obtain an utterance spectrum from the enrollment utterance.

14. The apparatus for enrollment of speaker authentication according to claim 13, wherein the spectrum generator fast-Fourier transforms each frame in the enrollment utterance to obtain a frame-spectrum of the frame.

15. The apparatus for enrollment of speaker authentication according to claim 14, wherein the filtering unit filters the frame-spectrum of each frame in the enrollment utterance with the filter-bank.

* * * * *